United States Patent
Bentz et al.

(10) Patent No.: US 7,466,720 B2
(45) Date of Patent: Dec. 16, 2008

(54) FLEXIBLE ARCHITECTURE FOR SONET AND OTN FRAME PROCESSING

(76) Inventors: Ole Bentz, 14604 NW. Wendy La., Portland, OR (US) 97229; Michael J. Haertel, 3424 NE. Holman St., Portland, OR (US) 97211; I. Claude Denton, 6965 SW. 162nd Pl., Beaverton, OR (US) 97007

( * ) Notice: Subject to any disclaimer, the term of this patent is extended or adjusted under 35 U.S.C. 154(b) by 1054 days.

(21) Appl. No.: 10/273,626

(22) Filed: Oct. 18, 2002

(65) Prior Publication Data
US 2004/0076195 A1 Apr. 22, 2004

(51) Int. Cl.
*H04J 3/16* (2006.01)
*H04J 3/22* (2006.01)

(52) U.S. Cl. .................................................... 370/466
(58) Field of Classification Search ............... 370/389, 370/466, 476
See application file for complete search history.

(56) References Cited

U.S. PATENT DOCUMENTS

| 5,504,927 A * | 4/1996 | Okamoto et al. ............. 710/58 |
| 2003/0120799 A1 * | 6/2003 | Lahav et al. ................. 709/236 |
| 2007/0110402 A1 * | 5/2007 | Unemura ....................... 386/95 |

* cited by examiner

*Primary Examiner*—Kevin C Harper (57) ABSTRACT

A flexible architecture is presented that allows either Synchronous Optical Network (SONET) framing, Optical Transport Network (OTN) framing, or SONET framing followed by OTN framing. The architecture consists of SONET frame processors, OTN frame processors, and a configurable selection network.

18 Claims, 5 Drawing Sheets

FLEXIBLE ARCHITECTURE FOR SONET AND OTN FRAME PROCESSING

FIELD OF THE INVENTION

The present invention pertains to the field of telecommunications. More particularly, this invention relates to a flexible architecture for Synchronous Optical Network (SONET) and Optical Transport Network (OTN) frame processing.

BACKGROUND

Synchronous Optical Network (SONET) and Optical Transport Network (OTN) define data transmission formats. A data stream can be conveyed through one or more physical networks and routed among multiple network paths by formatting electrical and/or optical signals as SONET or OTN data. Both formats package the signals into frame structures. Each frame includes a certain amount of control data, or overhead data, that is used to negotiate the frame through the physical network(s). Each frame also includes a certain amount of payload data that comprises the actual information that is being conveyed.

Fiber optics have provided a substantial increase in the volume of data that networks can carry over long distances. SONET and OTN define a number of different data rates for optical networks, currently from about 52 Megabits per second to about 40 Gigabits per second over a single optical fiber. In comparison, a typical analog modem operating at maximum efficiency can achieve a mere 56 Kilobits per second. At the 40 Gigabit rate, a single optical fiber can carry enough data to handle over 400,000 simultaneous voice calls. Optical networks are likely to carry even larger volumes of data in the future.

SONET was developed and adopted several years ago as a standardized data format for optical networks. At the time, data rates were primarily limited by the speed at which electrical components at either end of an optical fiber could process electrical signals. That is, even in an optical network, the data is still usually routed and processed in electrical form. The optical fibers are basically just pipes through which pulses of light are sent. A data stream is usually converted between electrical and optical signals each time the data stream is forwarded or routed through another segment of optical fiber.

The data rates for processing electrical signals have increased dramatically since the early days of optical networking. At the 40 Gigabit rate and beyond, new challenges have come to light that were not addressed by SONET. For instance, optical fibers are "lossy." That is, an optical signal loses intensity gradually as light "leaks" out over a length of fiber. If the signal intensity drops too low, the data represented by the signal cannot be recovered. In which case, optical signals are regenerated at particular intervals to maintain integrity of the data. Furthermore, at higher data rates, pulses of optical light are shorter than at lower data rates. Shorter pulses are more difficult to recognize than longer pulses. So, an amount of signal degradation that is acceptable at a lower data rate may not be acceptable at a higher data rate. In which case, the intervals at which optical signals are regenerated may be short enough to maintain signal integrity at lower data rates but not at higher data rates.

Obviously, one solution to improve signal integrity for higher data rates is to use shorter intervals of optical fiber. However, shortening the intervals by adding regeneration hardware to physical networks on a nation-wide or global scale would be prohibitively expensive. OTN provides an alternative solution to this problem, among other things.

In OTN, when a data stream is packaged into frames, forward error correction data is calculated for groups of payload data and then appended to a frame. When the payload data is extracted from the frame, the forward error correction data is used to detect and correct errors in the payload. The error correction data adds somewhat more overhead to the data stream than SONET overhead, but by solving the signal integrity issue, much higher data rates are possible over longer distances.

BRIEF DESCRIPTION OF THE DRAWINGS

Examples of the present invention are illustrated in the accompanying drawings. The accompanying drawings, however, do not limit the scope of the present invention. Similar references in the drawings indicate similar elements.

DETAILED DESCRIPTION

In the following detailed description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternate embodiments. In other instances, well known methods, procedures, components, and circuits have not been described in detail.

Parts of the description will be presented using terminology commonly employed by those skilled in the art to convey the substance of their work to others skilled in the art. Also, parts of the description will be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

Various operations will be described as multiple discrete steps performed in turn in a manner that is helpful in understanding the present invention. However, the order of description should not be construed as to imply that these operations are necessarily performed in the order they are presented, or even order dependent. Furthermore, repeated usage of the phrase "in one embodiment" does not necessarily refer to the same embodiment, although it may.

The present invention provides a flexible architecture for Synchronous Optical Network (SONET) and/or Optical Transport Network (OTN) frame processing. In various embodiments, the present invention is configurable to process SONET frames alone, OTN frames alone, and SONET frames within OTN frames. Embodiments of the present invention could also process OTN frames within SONET frames, although there may be little or no reason to do so in most situations.

As discussed above, OTN enables higher data rates over longer distances than SONET, but SONET consumes less bandwidth for overhead data. The flexible architecture of the present invention enables a user to take advantage of either SONET or OTN, depending on the circumstances. For instance, over short distances where signal degradation is not a problem, the present invention may be configured to support SONET frame processing, taking advantage of lower overhead and availability of SONET hardware. For longer distances where signal degradation is a problem, the present invention may be configured to support OTN, taking advantage of the superior error correction.

Moreover, since networks may convert from SONET hardware to OTN hardware over the next several years or decades, the present invention can be configured to initially support, for instance, an existing high data rate SONET network and then switch over to support a new OTN network. Combining one framing format within another is especially useful during transition periods where, for instance, parts of a network support SONET frames and parts of a network support OTN frames.

Figure 1:
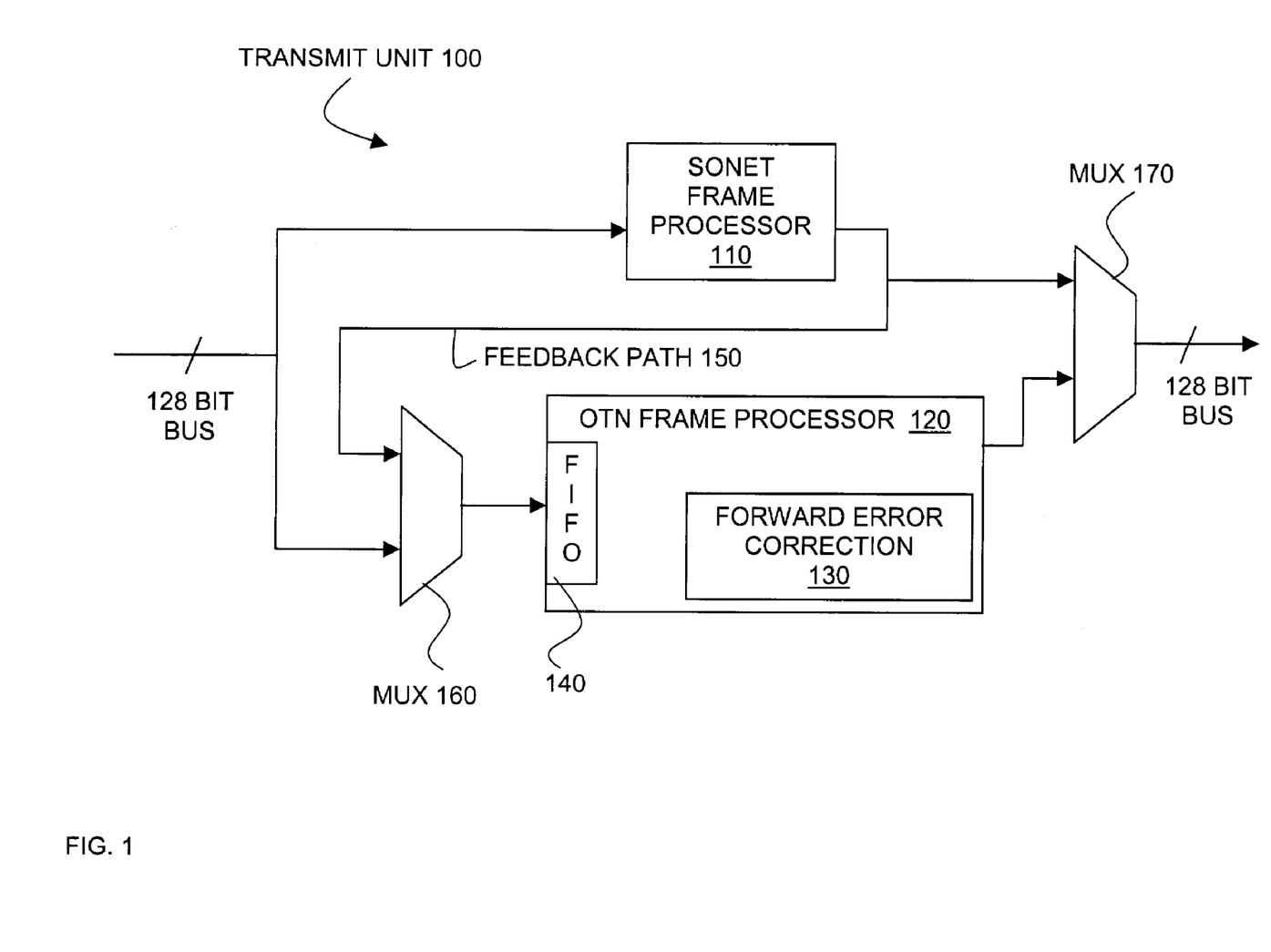
FIG. 1 illustrates one embodiment of the present invention for transmission into a SONET or OTN network.

FIG. 1 illustrates one embodiment of the present invention for transmission into a high data rate network. FIG. 1 illustrates a number implementation-specific details. Other embodiments may not include all of the elements shown, may include additional elements, may combine or separate one or more of the elements, may arrange elements in a different manner, and the like.

In the illustrated embodiment, transmit unit 100 includes a SONET frame processor 110, a OTN frame processor 120, and two two-to-one multiplexers (MUXes) 160 and 170 coupled as shown. Any number of SONET processors and OTN processors can be used for processors 110 and 120, and any number of input-selecting devices can be used for MUXes 160 and 170.

By configuring MUX 170 to select the output from SONET frame processor 110, transmit unit 100 produces SONET frames. By configuring MUX 170 to select the output from OTN frame processor 120, transmit unit 100 produces OTN frames. By configuring MUX 160 to select the input bus rather than feedback path 150, the payloads of the OTN frames contain whatever data is received at the input. By configuring MUX 160 to select the feedback path 150, the payloads of the OTN frames contain the SONET frames from processor 110.

In various embodiments, the input data stream can include any number of data formats. For instance, the input data stream could include a SONET stream, an Ethernet data stream, an Internet Protocol (IP) data stream, an Asynchronous Transfer Mode (ATM) data stream, a Fibre Channel data stream, a time division multiplexing (TDM) data stream, a frame relay data stream, or a combination there of.

An alternate embodiment could include an alternate or additional feedback back from the output of OTN processor 120 to an alternate or additional multiplexer at the input of SONET processor 110. In which case, by configuring this multiplexer to select the alternate or additional feedback path rather than the input bus to SONET processor 110, the payloads of the SONET frames would contain the OTN frames.

As discussed above, SONET frames and OTN frames add overhead data to a data stream. OTN adds about 7% of overhead to a data stream. For instance, OTN processor 120 includes forward error correction unit 130 that calculates forward error correction data based on the input stream. The error correction data is added to the OTN frames, along with control data. In which case, generating OTN frames requires additional output bandwidth.

Since the input bus and the output bus in the illustrated embodiment are both 128 bit buses, the operating frequency at the output bus needs to be higher than the operating frequency at the input bus in order to match the input and output data rates. In other words, the output operating frequency needs to be approximately 7% higher.

In order to bridge the gap between the two frequency domains, OTN processor 120 uses a burst compensating buffer, first-in-first-out (FIFO) 140, to continually output valid data. The data stream at the input to processor 120 flows into FIFO 140 and accumulates in bursts while processor 120 outputs generated data, such as control data or forward error correction data. Then, when processor 120 is done with a set of generated data, processor 120 reads payload data out from FIFO 140. FIFO 140 is appropriately sized so as not to underflow as data is read and not to overflow while generated data is used.

SONET overhead adds about 3.4% to the data stream. In which case, SONET processor 110 could use a burst compensating buffer like FIFO 140. However, if the input stream consists only of SONET data streams, multiple independent SONET streams can be multiplexed into a single SONET data stream without additional bandwidth for overhead. For instance, four 10 Gigabit SONET streams can be combined into one 40 Gigabit SONET stream with no additional overhead data. Since no additional bandwidth is needed, the operating frequency at the input and the output of transmit unit 100 is the same when unit 100 is used to multiplex multiple SONET streams into a single SONET stream. For a 40 Gigabit data rate, the operating frequency is approximately 311 Mhz.

Alternate embodiments may use multiple additional burst compensating buffers and may place the buffers in different locations. For instance, where the input data does not comprise multiple independent SONET frames, transmit unit 100 may have three burst compensating buffers. One buffer for SONET processor 110 to match the input operating frequency to a 3.4% higher SONET output frequency. One buffer for OTN processor 120 to match the input operating frequency to a 7% higher OTN operating frequency. And, when transmit unit 100 is configured to frame SONET frames within OTN frames, OTN processor 120 could include a second buffer to match the SONET output frequency to the higher OTN output frequency. As another example, in the alternate embodiment where transmit unit 100 is configurable to frame OTN frames in SONET frames, SONET processor 110 may have a second burst compensating buffer to match the OTN output frequency to the SONET output frequency. As yet another example, FIFO 140 need not be located within processor 120, but could instead be placed at any number of positions along the boundary between two frequency domains.

In one embodiment where SONET processor 110 comprises a multiplexer to combine multiple independent SONET streams into a single SONET stream, the multiple independent SONET streams are not entirely "independent." That is, the architecture of processor 110 can be greatly simplified if the input data streams are required to be frame aligned to within a particular number of cycles. For instance, the first byte of one SONET frame from one stream arrives at SONET processor 110 within, for instance, seven clock cycles from the first byte of SONET frames from each of the other streams.

Figure 2:
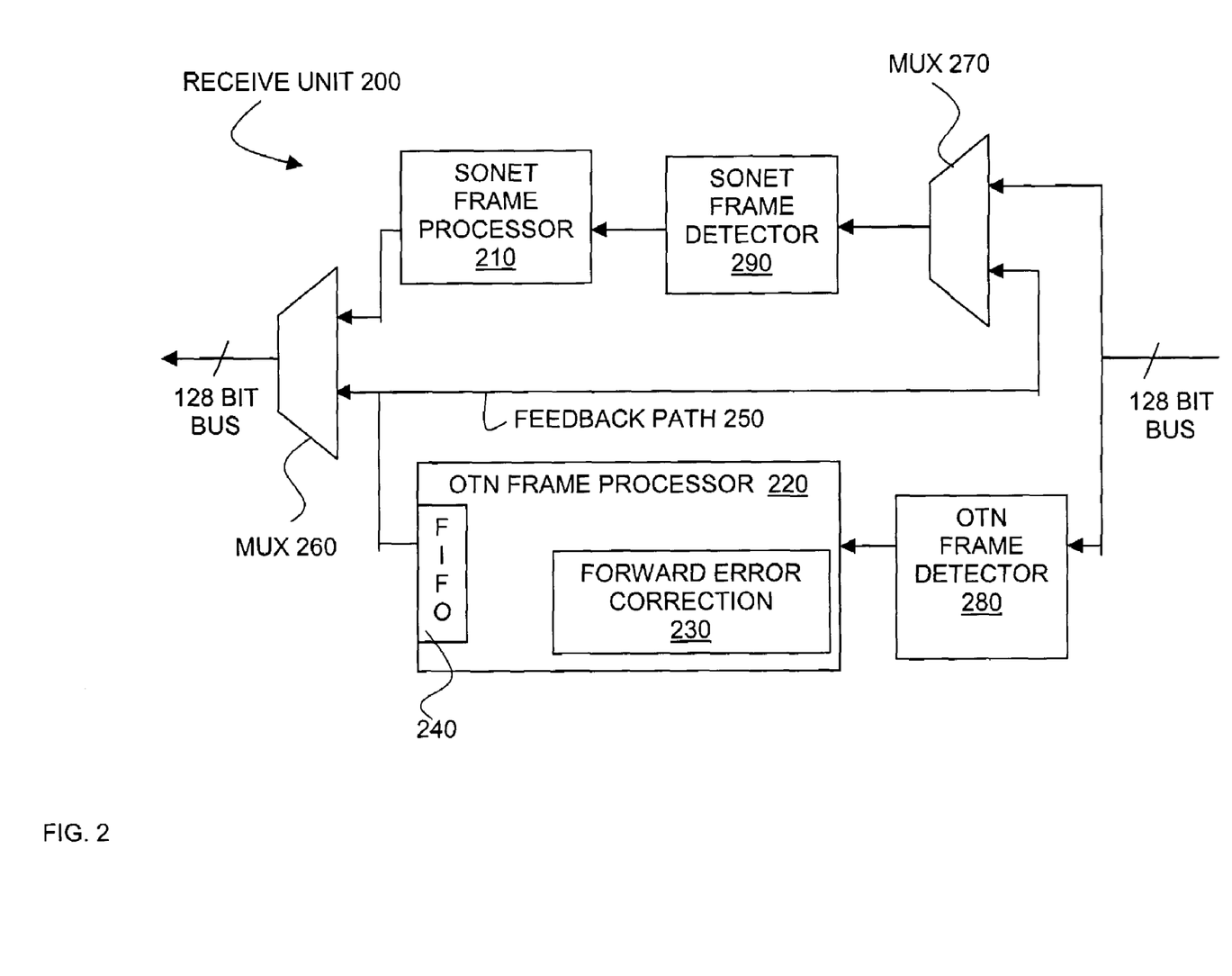
FIG. 2 illustrates one embodiment of the present invention for reception out of a SONET or OTN network.

FIG. 2 illustrates one embodiment of the present invention for reception out of a high data rate network. FIG. 2 illustrates a number implementation-specific details. Other embodiments may not include all of the elements shown, may include additional elements, may combine or separate one or more of the elements, may arrange elements in a different manner, and the like.

In the illustrated embodiment, receive unit 200 includes a SONET frame processor 210, a SONET frame detector 290, a OTN frame processor 220, a OTN frame detector 280, and two two-to-one multiplexers (MUXes) 260 and 270 coupled as shown. The embodiment of FIG. 2 basically performs the inverse of all the same operations described above for the embodiment of FIG. 1. That is, all the same embodiments are possible. For instance, receive unit 200 in the illustrated embodiment can support SONET alone, OTN alone, as well as SONET in OTN. Moreover, the same rate matching issues are addressed in receive unit 200, but from higher to lower frequency rather than lower to higher frequency as overhead data is stripped away.

The only "new" elements in FIG. 2 compared to FIG. 1 are the frame detectors 280 and 290. As frames travel through SONET or OTN networks, the frames may be serialized and deserialized any number of times. In the process, the alignment of data becomes completely arbitrary. Consequently, payload data arriving at ingress unit 200 may not be byte aligned. Frame detectors 280 and 290 identify known frame markers to recognize the beginning of a frame and align the data to the data path width, 128 bits in the illustrated embodiment. Any number of frame detectors can be used for frame detectors 280 and 290.

There are two frame detectors in the illustrated embodiment because a SONET frame within an OTN frame may be mis-aligned independent of the OTN frame. In which case, detector 280 detects and aligns OTN frames before processor 120 strips off header information, and forward error correction unit 230 checks and corrects the payload data based on the forward error correction data. FIFO 240 rate-matches the output data stream. Then, if MUX 270 is configured to select feedback path 250, frame detector 290 detects and aligns SONET frames before SONET processor 210 demultiplexes the independent SONET streams.

Figure 3:
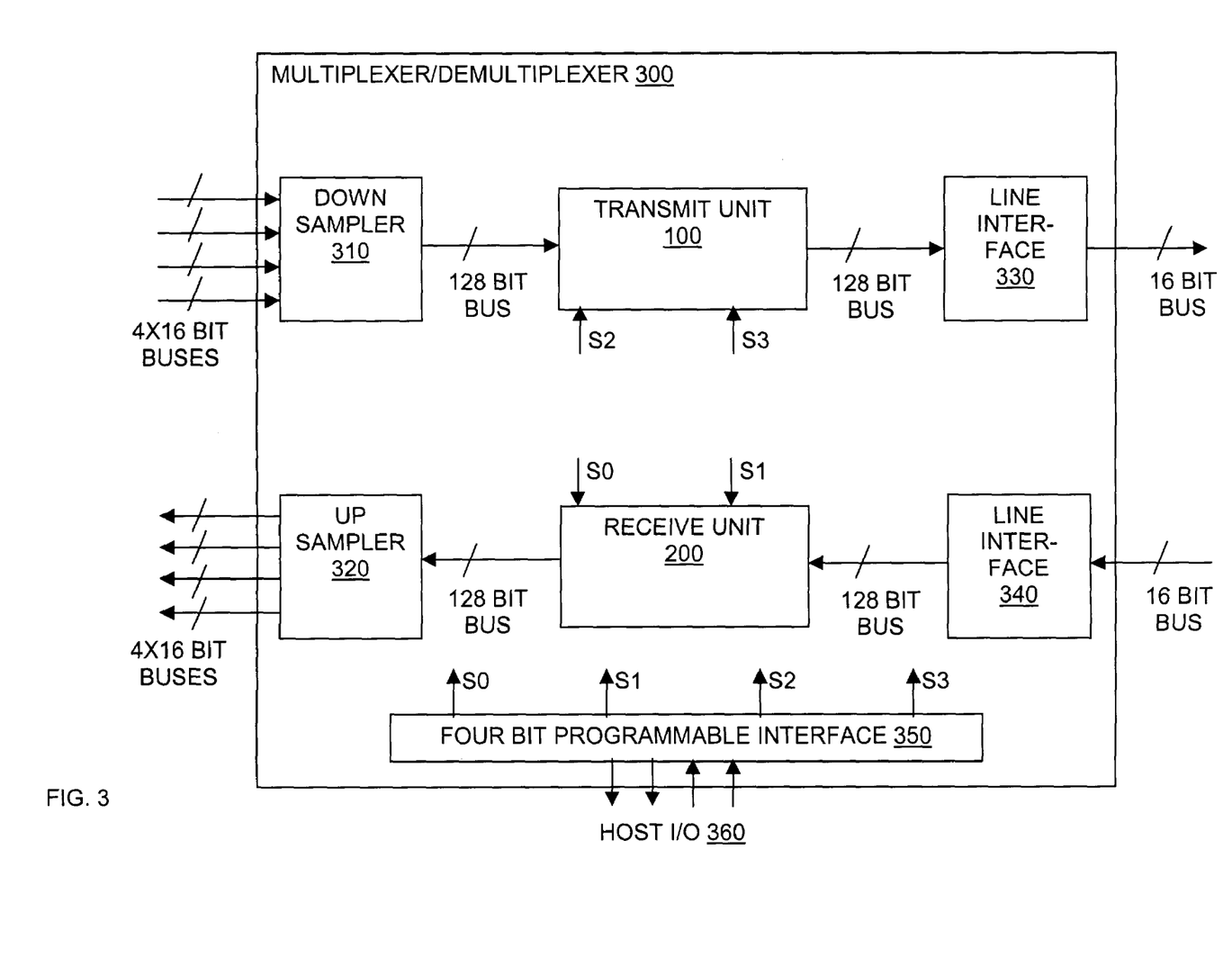
FIG. 3 illustrates one embodiment of the present invention for both transmission and reception in a single circuit.

FIG. 3 illustrates another embodiment of the present invention including both the transmit unit 100 and receive unit 200 within the same multiplexer/demultiplexer circuit 300. Circuit 300 also includes down sampler 310, up sampler 320, line interfaces 330 and 340, and programmable interface 350 coupled as shown. Obviously, FIG. 3 includes a number of implementation-specific details, and a wide variety of alternate embodiments are possible. In one embodiment, circuit 300 comprises a single chip. In another embodiment, circuit 300 comprises a printed circuit board to which the other elements are coupled.

Samplers 310 and 320 are used to interface between common system bus architectures having four 16 bit buses operating at 622 Mhz and the 128 bit buses of transmit and receive units 100 and 200 operating at 311 Mhz. The four 16 bit input buses provide 64 bits per clock cycle. So, down sampler 310 combines two clock cycles worth of data and provides 128 bits in parallel every other clock cycle. The four 16 bit output buses consume 64 bits per clock cycle. So, up sampler 320 receives 128 bits in parallel every other clock cycle, separates them into 64 bit data words, and outputs 64 bits every clock cycle.

Line interfaces 330 and 340 match the internal operating frequency to the external operating frequency of the high speed network. The line interfaces convert from 128 bit data words down to 16 bit data words. In which case, the external operating frequency is 8 times that of the internal operating frequency. Also, depending on how the transmit and receive units 100 and 200 are configured, the internal operating frequency for the line interfaces could be any one of several possible frequencies. For instance, for pure 40 Gigabit SONET multiplexing of multiple SONET streams, the internal frequency for a 128 bit bus is approximately 311 Mhz. For 40 Gigabit SONET framing of data in general, the internal frequency will be about 3.4% higher than the frequency at the input to transmit unit 100. For OTN framing, the internal frequency will be about 7% higher than the frequency at the input to transmit unit 100. In which case, line interfaces 330 and 340 are capable of handling each frequency.

Programmable interface 350 has input/output ports 360 so that it can be programmed by a host device, such as a processor or micro-controller. In the illustrated embodiment, programmable interface 350 stores four configuration bits, S0, S1, S2, and S3. Any number of storage devices can be used for interface 350, including latches or registers, volatile or non-volatile memory, etc. The four configuration bits are coupled to the select lines for each multiplexer, MUXes 160, 170, 260, and 270 in transmit unit 100 and receive unit 200. Using various combinations of the configuration bits, the circuit 300 can be configured as discussed above to multiplex/demultiplex SONET, OTN, SONET in OTN, and/or OTN in SONET data.

Figure 4:
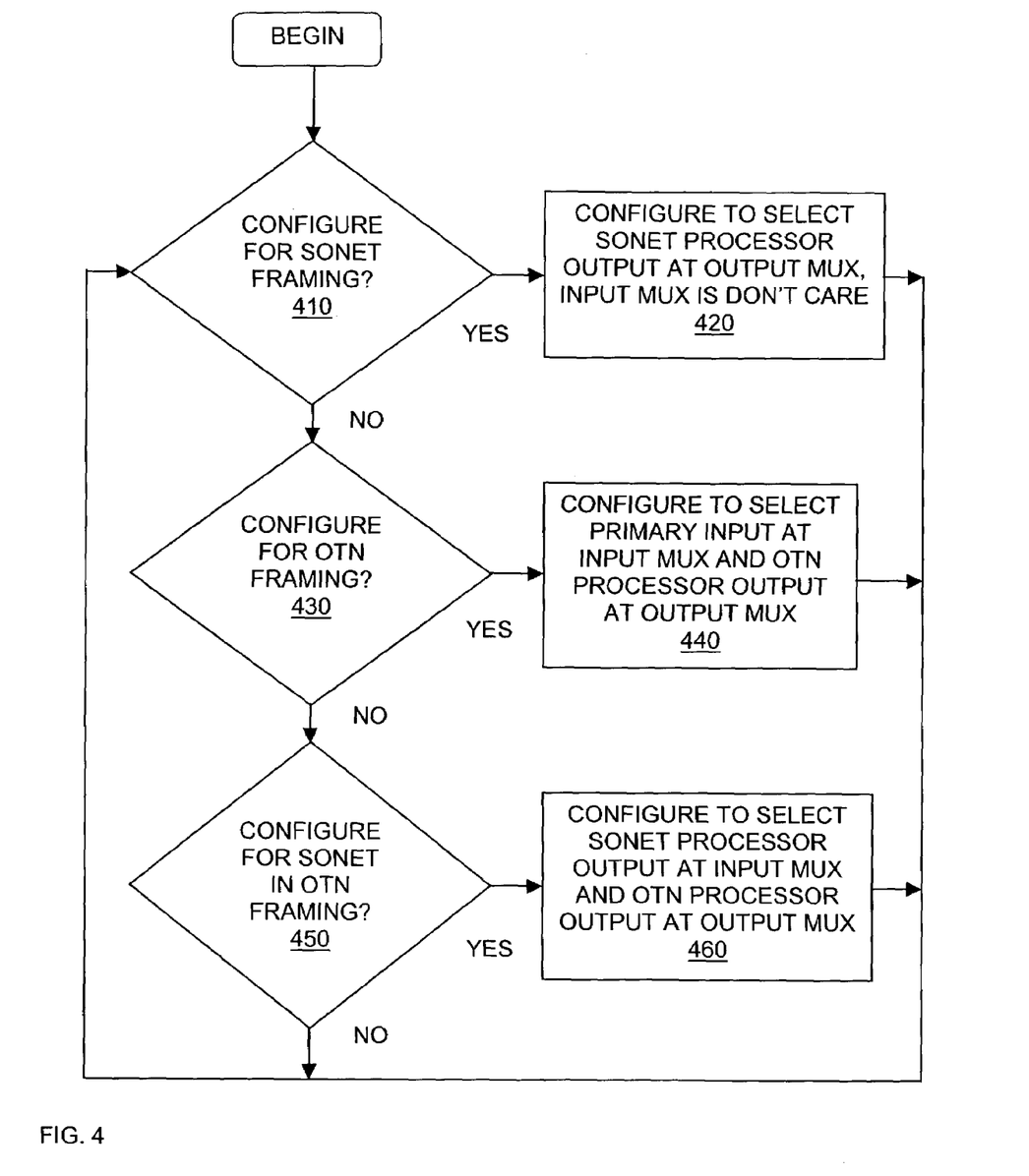
FIG. 4 demonstrates an operational flow for configuring one embodiment of the present invention for transmission.

FIG. 4 demonstrates a flow for one embodiment of the present invention for configuring a transmit unit, such as transmit unit 100. FIG. 4 illustrates a number of implementation-specific details. Other embodiments may perform the functions in a different order, exclude one or more functions, add one or more functions, combine and/or separate one or more functions, and the like.

At 410, if the transmit unit is to be configured for SONET framing only, the unit is configured at 420 such that the output mux, such as mux 170, selects the output from the SONET processor. The configuration for the input mux, such as mux 160, does not matter because the entire data path through the input mux and OTN processor is bypassed. From 420, the process loops back around to 410.

If the transmit unit is to be configured for OTN framing only at 430, the unit is configured at 440 such that the input mux selects the primary input and the output mux selects the output from the OTN processor. From 440, the process loops back around to 410 again.

If the transmit unit is to be configured for SONET framing in OTN framing at 450, the unit is configured at 460 such that the input mux selects the output from the SONET processor and the output mux selects the output from the OTN mux. From 460, the process loops back around to 410 again.

Figure 5:
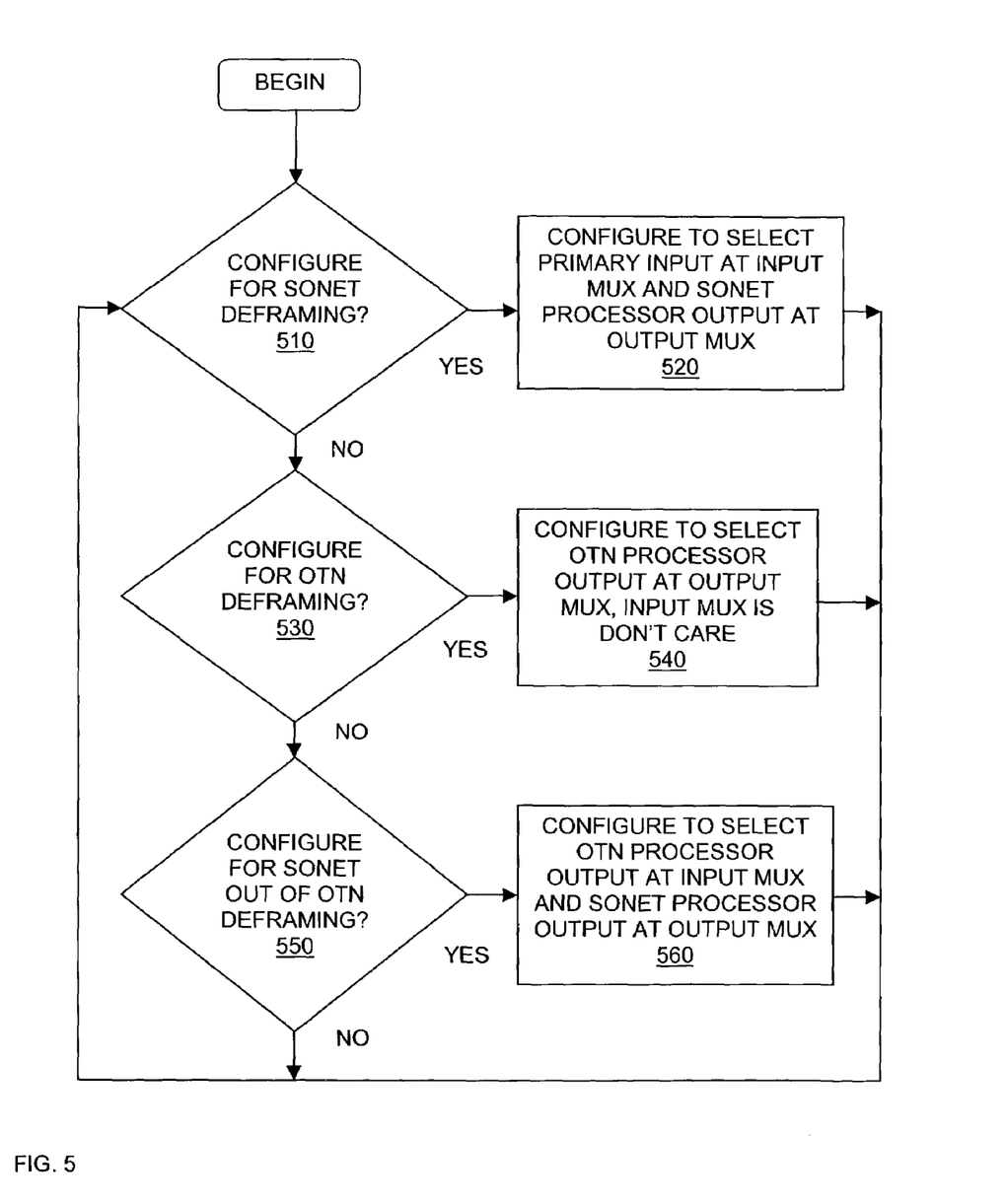
FIG. 5 demonstrates an operational flow for configuring one embodiment of the present invention for reception.

FIG. 5 demonstrates a flow for one embodiment of the present invention for configuring a receive unit, such as transmit unit 100. The illustrated embodiment is very similar to the one shown in FIG. 4. At 510, if the receive unit is to deframe SONET only, the unit is configured at 520 such that the input mux selects the primary input and the output mux selects the output from the SONET processor. At 530, if the receive unit is to be configured for OTN deframing only, the unit is configured at 540 such that the output mux selects the output from the OTN processor. The configuration of the input mux does not matter. At 550, if the receive unit is to be configured for deframing SONET frames out of OTN frames, the receive unit is configured at 560 such that the input mux selects the output from the OTN processor and the output mux selects the output from the SONET processor.

A similar process could be used for the reverse direction. As noted above with respect to FIG. 2, the reverse direction may include additional functions for detecting frame markers and byte aligning frames prior to processing.

In one embodiment, the present invention, as described above, is implemented as part of an application specific integrated circuit (ASIC) for protocol processing. The software described could be implemented in code running on an embedded controller as will be comprehended by a person skilled in the art. In another example, field programmable gate arrays (FPGAs) or static programmable gate arrays (SPGA) could be used to implement one or more functions of the present invention. In yet another example, a combination of hardware and software could be used to implement one or more functions of the present invention.

Thus, a flexible architecture for Synchronous Optical Network (SONET) and OTN frame processing is described. Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

What is claimed is:

1. An apparatus comprising:
   an Optical Transport Network (OTN) frame processor having an input port coupled to a primary input bus and an output port coupled to an OTN output bus;
   a Synchronous Optical Network (SONET) frame processor having an output port coupled to a SONET output bus and an input port selectably coupled to one of the primary input bus and the OTN output bus;
   a SONET frame detector coupled between the input port of the SONET frame processor and the primary input bus and the OTN output bus; and
   a primary output bus selectably coupled to one of the SONET output bus and the OTN output bus.

2. The apparatus of claim 1 further comprising:
   a two-to-one selector selectably coupling the primary input bus and the OTN output bus to the input port of the SONET frame processor.

3. The apparatus of claim 2 further comprising:
   a programmable interface equipped to store a selection indicator for the two-to-one selector.

4. The apparatus of claim 1 further comprising:
   a two-to-one selector selectably coupling the SONET output bus and the OTN output bus to the primary output bus.

5. The apparatus of claim 4 further comprising:
   a programmable interface equipped to store a selection indicator for the two-to-one selector.

6. The apparatus of claim 1 further comprising:
   a forward error correction unit equipped to read forward error correction data and payload data from OTN frames received at the input port of the OTN frame processor, and calculate forward error correction results based, at least in part, on the forward error correction data and the payload data.

7. The apparatus of claim 1 further comprising:
   a burst compensation buffer equipped to store a particular amount of output data from the OTN frame processor to match an input data rate for the OTN frame processor to an output data rate for the OTN frame processor.

8. The apparatus of claim 1 wherein the SONET frame processor comprises:
   a SONET demultiplexer equipped to demultiplex a plurality of independent SONET streams from a single SONET stream.

9. The apparatus of claim 1 further comprising:
   an OTN frame detector coupled between the primary input bus and the input port of the OTN frame processor.

10. A method comprising:
    deframing Optical Transport Network (OTN) frames from a primary data stream into a first data stream;
    selecting either the primary data stream or the first data stream as a selected signal;
    detecting a Synchronous Optical Network (SONET) frame from the selected signal to generate a detected SONET stream;
    after detecting the SONET frame, receiving the detected SONET stream into a SONET frame processor;
    deframing said detected SONET stream into a second data stream; and
    selectably transmitting either the first data stream or the second data stream as an output data stream.

11. The method of claim 10 further comprising:
    configuring a selection of either the primary input data stream or the first data stream for deframing into the second data stream.

12. The method of claim 10 further comprising:
    configuring a selection of either the first data stream or the second data stream for transmitting.

13. The method of claim 10 wherein the primary input comprises a single SONET data stream having a first data rate, and wherein the output data stream comprises four independent SONET data streams, each having a second data rate that is one-quarter of the first data rate.

14. The method of claim 10 wherein the output data stream comprises at least one data stream selected from the group consisting essentially of a SONET data stream, an Ethernet data stream, an Internet Protocol (IP) data stream, an Asynchronous Transfer Mode (ATM) data stream, a fibre Channel data stream, a time division multiplexing (TDM) data stream, and a frame relay data stream.

15. The method of claim 10 wherein selectably deframing comprises:
    stripping a SONET header from SONET frames; and
    extracting a payload data from the SONET frames.

16. The method of claim 10 wherein the primary input comprises an OTN data stream, wherein an output data rate following deframing of the OTN frames is lower than an input data rate to accommodate overhead data inserted into the OTN data stream, and wherein deframing the OTN frames comprises:
    matching the output data rate to the input data rate.

17. The method of claim 10 wherein, prior to deframing the OTN frames, the method further comprises:
    detecting the OTN frames in the primary data stream; and
    aligning the OTN frames.

18. The method of claim 10 wherein detecting further comprises:
    aligning SONET frames.

* * * * *

UNITED STATES PATENT AND TRADEMARK OFFICE
CERTIFICATE OF CORRECTION

PATENT NO. : 7,466,720 B2  Page 1 of 1
APPLICATION NO. : 10/273626
DATED : December 16, 2008
INVENTOR(S) : Bentz et al.

It is certified that error appears in the above-identified patent and that said Letters Patent is hereby corrected as shown below:

Col. 8, line 39, "stream, a fibre Channel" should read --stream, a Fibre Channel--.
Col. 8, line 24, "the primary input data" should read --the primary data--.
Col. 8, lines 30-31, "the primary input comprises" should read --the primary data stream comprises--.
Col. 8, lines 46-47, "the primary input comprises" should read --the primary data stream comprises--.

Signed and Sealed this

Thirtieth Day of November, 2010

David J. Kappos
*Director of the United States Patent and Trademark Office*